US008149902B1

(12) United States Patent
Mohindra

(10) Patent No.: US 8,149,902 B1
(45) Date of Patent: Apr. 3, 2012

(54) METHODS TO RELAX THE SECOND ORDER INTERCEPT POINT OF TRANSCEIVERS

(75) Inventor: Rishi Mohindra, Milpitas, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 1067 days.

(21) Appl. No.: 11/854,968

(22) Filed: Sep. 13, 2007

(51) Int. Cl.
*H04B 1/38* (2006.01)
*H04B 1/40* (2006.01)
*H04L 27/28* (2006.01)
*H04L 27/36* (2006.01)
*H04L 27/38* (2006.01)

(52) U.S. Cl. ........ 375/219; 375/260; 375/296; 375/326; 455/86

(58) Field of Classification Search .................. 375/260, 375/316, 326, 340, 144, 148, 219–233, 259, 375/267, 295–296, 299, 306–307, 319–320, 375/346–348; 370/277, 281, 295, 319, 343–344, 370/478, 480–481, 302, 330; 455/296, 310, 455/313, 315–317, 323, 324, 69, 73, 78, 455/85–87, 114.2; 329/307–309, 306; 708/290
See application file for complete search history.

(56) References Cited

U.S. PATENT DOCUMENTS

| | | | |
|---|---|---|---|
| 5,946,292 A * | 8/1999 | Tsujishita et al. | 370/204 |
| 6,856,791 B2 * | 2/2005 | Klemmer | 455/76 |
| 7,675,983 B2 * | 3/2010 | Gorday et al. | 375/260 |
| 2002/0181509 A1 * | 12/2002 | Mody et al. | 370/480 |
| 2002/0184653 A1 * | 12/2002 | Pierce et al. | 725/143 |
| 2004/0114675 A1 * | 6/2004 | Crawford | 375/149 |
| 2005/0041693 A1 * | 2/2005 | Priotti | 370/503 |
| 2005/0180314 A1 * | 8/2005 | Webster et al. | 370/208 |
| 2006/0176990 A1 * | 8/2006 | Oishi et al. | 375/350 |
| 2006/0239370 A1 * | 10/2006 | Mody et al. | 375/260 |
| 2007/0058708 A1 * | 3/2007 | Bultan et al. | 375/226 |
| 2007/0092040 A1 * | 4/2007 | Higashino | 375/327 |
| 2008/0176575 A1 * | 7/2008 | Sutton | 455/450 |
| 2010/0098195 A1 * | 4/2010 | Nekhamkin et al. | 375/344 |

OTHER PUBLICATIONS

Ayadi, D., System Level Design of Radio Frequecny Receiver for IEEE 802.16 Standard, 2008, Design and Test Workshop, 2008. IDT 2008. 3rd International, pp. 82-86.*

(Continued)

*Primary Examiner* — Tesfaldet Bocure
*Assistant Examiner* — Lawrence Williams
(74) *Attorney, Agent, or Firm* — Blakely Sokoloff Taylor & Zafman LLP

(57) ABSTRACT

Methods to relax the second order intercept point of transceivers for multi-carrier and OFDM (such as IEEE 802.11a/g and 802.16) based zero IF wireless receivers that need to work in an environment with strong jamming signals, such as, for example, WLAN modules in Smart Phones. Due to the poor IP2 of WLAN (wireless local area network) receivers, unacceptable DC signals are produced in the I,Q quadrature paths when a strong out-of-band signal is received, e.g., from a co-located GSM phone. This completely destroys the received WLAN packet, resulting in an unacceptably high PER (packet error rate). In one aspect, the mixer reference for the receiver is effectively shifted (corrected) to accurately match the carrier of the received signal. In another aspect, the carrier is uncorrected for transmission. In still another aspect, a continuous DC correction is made on a per symbol basis. In still another aspect, the DC correction and the frequency correction are used together. Various embodiments are disclosed.

3 Claims, 12 Drawing Sheets

OTHER PUBLICATIONS

Dufrene, K., Digital Adaptive IIP2 Calibration Scheme for CMOS Downconversion Mixers, 2008, IEEE Journal of Solid-State Circuits, vol. 43, No. 11, pp. 2434-2445.*

Valkama, A, Advanced Digital Signal Processing Techniques for Compensation of Nonlinear Distortion in Wideband Multicarrier Radio Receivers, Jun. 200, IEEE Trans. Microwave Theory Tech., vol. 54, No. 1, pp. 2356-2366.*

Beek et al., ML Estimation of Time and Frequency Offset in OFDM Systems, Jul. 2007, IEEE Transctions on Signal Processing, vol. 45, No. 7, pp. 1800-1805.*

* cited by examiner

WLAN enabled GSM smart phone

| Cell Phone Ant to WLAN Ant Separation | 0.09 | m | WLAN PA Gain | 30 | dB | WLAN Ant. Feed Tx Power | 15 | dBm | WLAN RF Front-end Loss | 3 | dB | WD30 Tx Power | -12 | dBm |
|---|---|---|---|---|---|---|---|---|---|---|---|---|---|---|

| Cell Phone Freq band | Cell Phone Noise Fig | Cell Phone Rx sensitivity reduction | Cell Phone Ant gain | Max. allowed EIRP from WLAN Ant. | WLAN Ant. Gain | WLAN Ant. + PA rejection | Band Pass filter rejection (Soshin MDR775) | Max. allowed Tx Emission (at PA input). Note 1. | | Max. allowed WD30 Rx Emission. Note 1. |
|---|---|---|---|---|---|---|---|---|---|---|
| MHz | dB | dB | dB | dBm/Hz | dB | dB | dB | dBm/Hz | dBc | dBm/Hz |
| 869 | 7 | 1 | -1 | -161.6 | -2 | 10 | 45 | -131.6 | -119.6 | -111.6 |
| 894 | 7 | 1 | -1 | -161.3 | -2 | 10 | 45 | -131.3 | -119.3 | -111.3 |
| 925 | 7 | 1 | -1 | -161.0 | -2 | 10 | 45 | -131.0 | -119.0 | -111.0 |
| 960 | 7 | 1 | -1 | -160.7 | -2 | 10 | 45 | -130.7 | -118.7 | -110.7 |
| 1570 | 3.5 | 0.5 | -1 | -163.2 | -2 | 5 | 40 | -143.2 | -131.2 | -118.2 |
| 1581 | 3.5 | 0.5 | -1 | -163.1 | -2 | 5 | 40 | -143.1 | -131.1 | -118.1 |
| 1805 | 7 | 1 | -1 | -155.2 | -2 | 2 | 40 | -138.2 | -126.2 | -110.2 |
| 1880 | 7 | 1 | -1 | -154.9 | -2 | 2 | 40 | -137.9 | -125.9 | -109.9 |
| 1930 | 7 | 1 | -1 | -154.6 | -2 | 2 | 35 | -142.6 | -130.6 | -114.6 |
| 1990 | 7 | 1 | -1 | -154.4 | -2 | 2 | 35 | -142.4 | -130.4 | -114.4 |
| 2110 | 7 | 1 | -1 | -153.9 | -2 | 1 | 20 | -157.9 | -145.9 | -128.9 |
| 2170 | 7 | 1 | -1 | -153.6 | -2 | 1 | 20 | -157.6 | -145.6 | -128.6 |

Note 1: The max allowed WLAN spurious emission levels will result in specified Cell Phone Rx sensitivity reduction. The emission level is dependent on WLAN-Cell phone antenna separation, cell phone noise figure, antenna gains, WLAN RF band pass filter rejection, and spurious emission frequency.

*FIG. 2* (Prior Art)

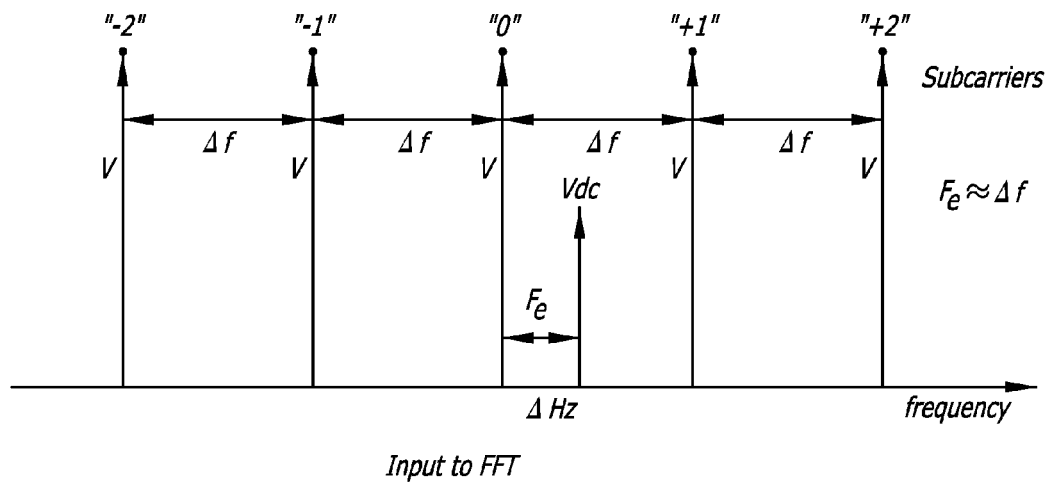
Input to FFT
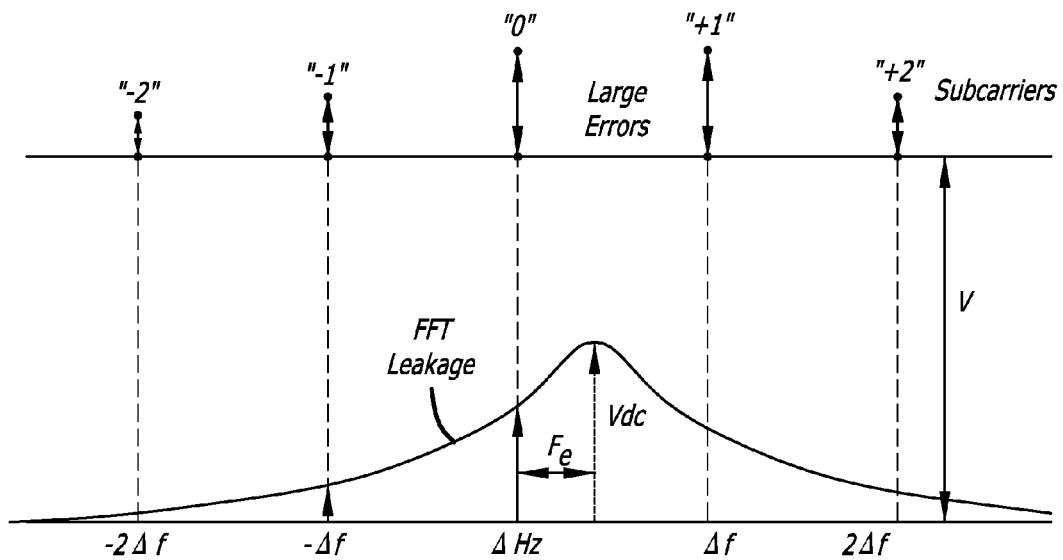
Frequency corrected output of FFT
FIG. 4 (Prior Art)

METHODS TO RELAX THE SECOND ORDER INTERCEPT POINT OF TRANSCEIVERS

BACKGROUND OF THE INVENTION

1. Field of the Invention

The present invention relates to the field of wireless receivers.

2. Prior Art

This invention concerns a method to relax the IP2 (2nd order intercept point) for multi-carrier and OFDM (such as IEEE 802.11a/g and 802.16e) based zero IF wireless receivers that need to work in an environment with strong jamming signals, such as, for example, WLAN modules in Smart Phones.

Due to the poor IP2 of WLAN (wireless local area network) receivers, unacceptable DC signals are produced in the I,Q quadrature paths when a strong out-of-band signal is received, e.g., from a co-located GSM phone. This completely destroys the received WLAN packet, resulting in an unacceptably high PER (packet error rate). Similar interference results from co-located GSM cell phone and a WiMAX 802.16e transceiver.

BRIEF DESCRIPTION OF THE DRAWINGS

FIG. 2 is Table 1 which list the power levels for a cell phone and a WLAN.

FIG. 4 depicts the effect of frequency error on the FFT (fast Fourier transform) output in the demodulator (digital signal processor) of the Receive block of FIG. 3 when the frequency error $F_e$ is substantial.

DETAILED DESCRIPTION OF THE PREFERRED EMBODIMENTS

The present invention is preferably implemented in a digital signal processor. By way of example, the present invention allows the IP2 requirement of certain RF transceiver ICs designed specifically for 802.11 WLAN applications to be less than +40 dBm, instead of +53 dBm without the invention, which would result in very poor transceiver IC yield.

Figure 1:
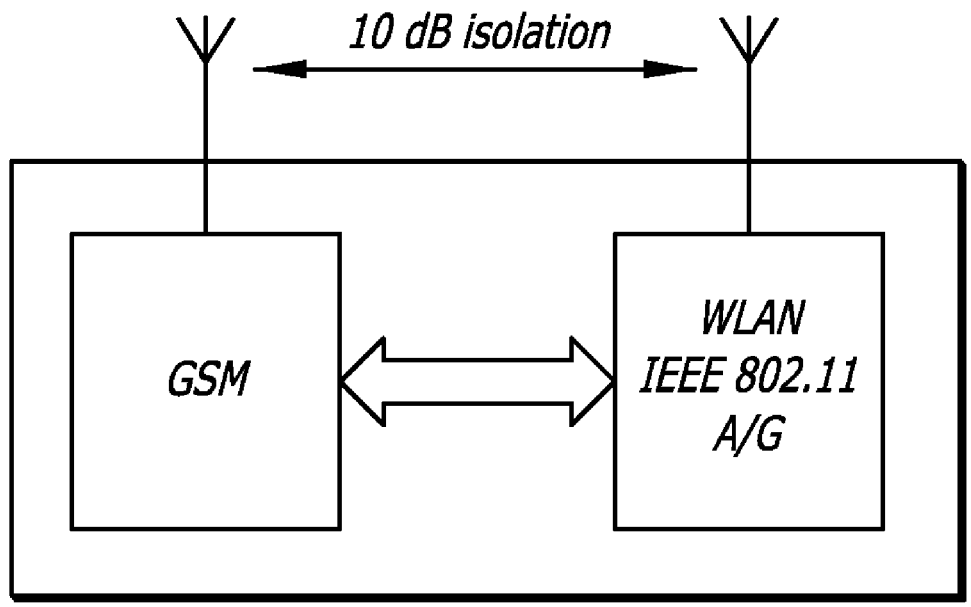
FIG. 1 illustrates a basic WLAN enabled GSM Smart Phone.

A WLAN enabled GSM Smart Phone is depicted in FIG. 1. The isolation between the GSM and WLAN antennas is about 10 dB, which means that the WLAN receiver will be blocked with a +23 dBm GSM signal at the antenna port. After down conversion to I,Q zero IF baseband in the WLAN Rx (receiver) as in FIG. 3, the out-of-band GSM signal results in a DC step at the output. The power of the DC step when referred to the RF input is given by:

$$P_{DC}=2P_{GSM}-IP2$$

For GSM900, $P_{GSM}$ is about −27 dBm at the WLAN Rx LNA (low noise amplifier) input, due to the filtering from the RF bandpass filter F1. If $P_{DC}$ has to be kept 15 dB less than the WLAN signal of −74 dBm, the required IP2 is +36 dBm, which can be easily achieved. This level of DC step is acceptable from the consideration of I,Q A/D input clipping and therefore additional back-off requirement at A/D input.

However, −15 dBc of DC step will completely destroy the WLAN packet if the GSM Tx overlaps with the WLAN Rx packet. To prevent this, the DC step must be kept much smaller, i.e., at or below a −31 dBc level relative to the WLAN Rx signal of −74 dBm. This requires an IP2 of +52 dBm that is extremely difficult to achieve. Table 1 (FIG. 2) lists the various power levels.

Figure 3:
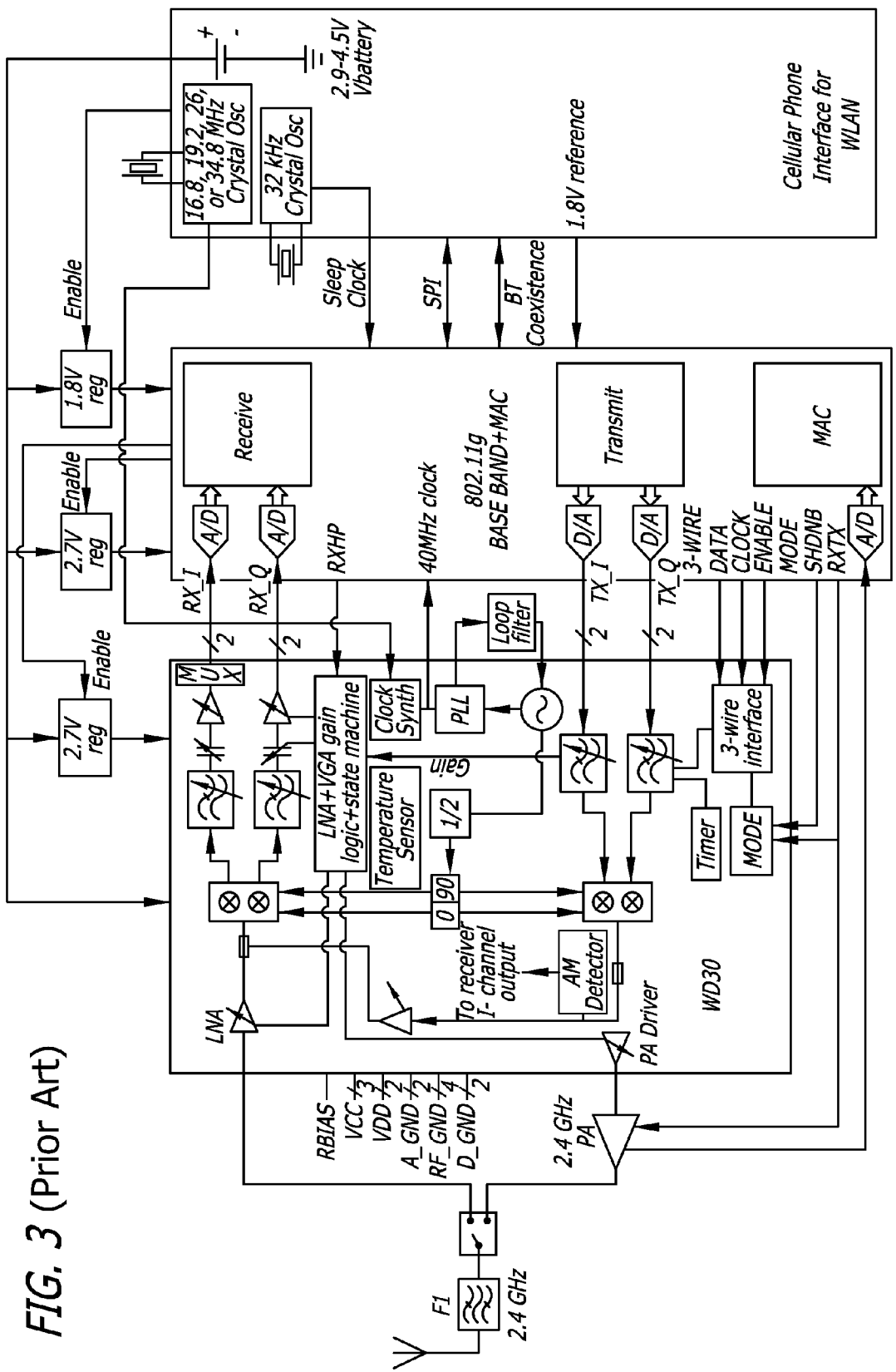
FIG. 3 is a block diagram of a single chip transceiver for cellular and smart phones.
Figure 5:
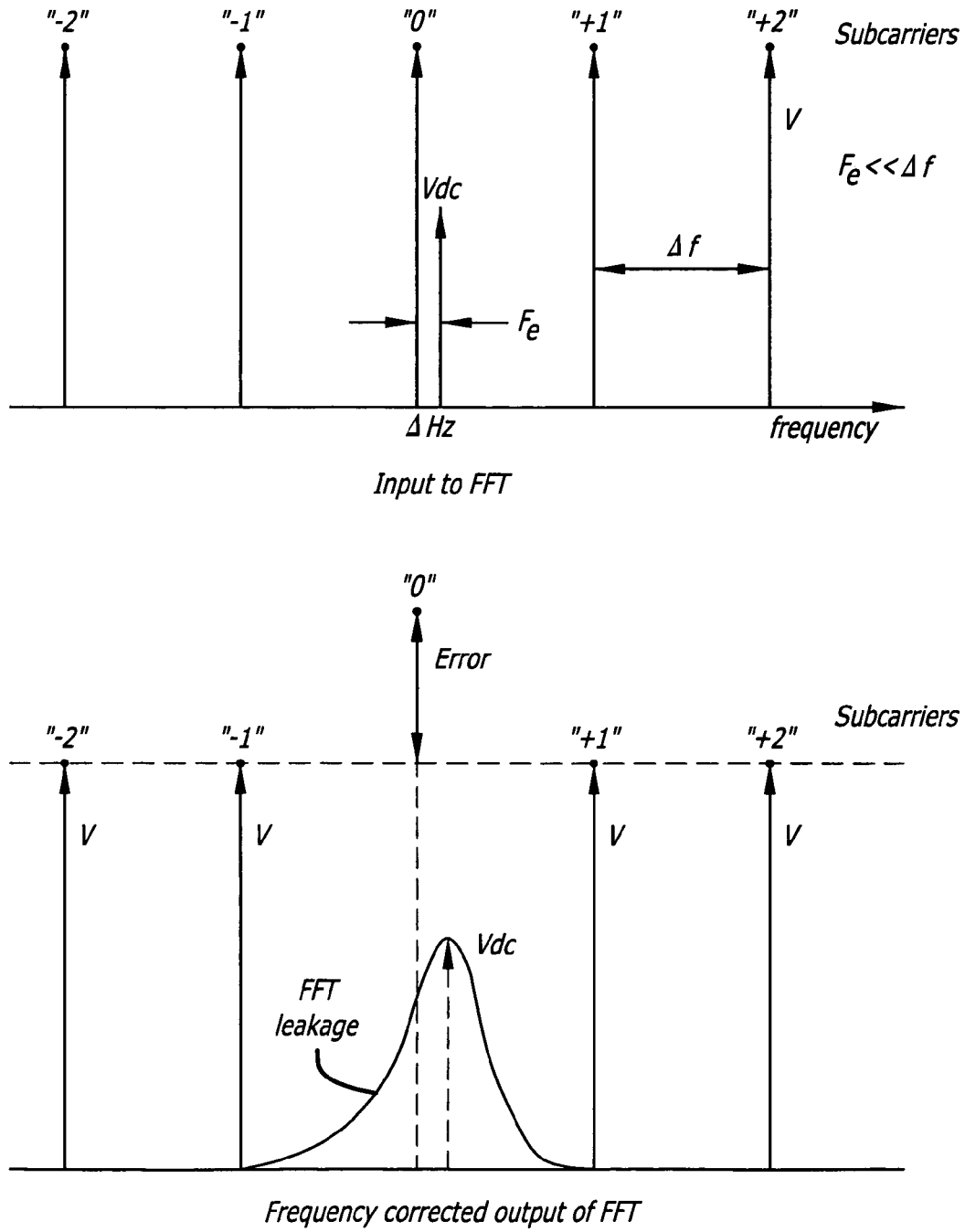
FIG. 5 depicts the effect of frequency error on the FFT (fast Fourier transform) output in the demodulator (digital signal processor) of the Receive block of FIG. 3 when the frequency error $F_e$ is not substantial.

By programming the RF synthesizers (PLL) of the WLAN transceivers so that the LO (local oscillator) frequency error $F_e$ is within ±10 kHz of the received signal carrier frequency, the IP2 can be relaxed to +36 dBm. This is because the FFT leakage from the DC level in the OFDM demodulator is small, even compared to the first subcarrier, when the zero-subcarrier is close to 0 Hz, instead of the frequency error $F_e$ normally being up to about 250 kHz that results from the allowed ±20 ppm reference clock tolerance. This is illustrated in FIGS. 4 and 5, which depict the effect of frequency error on the FFT (fast Fourier transform) output in the demodulator (digital signal processor) of the Receive block (FIG. 3). Here, $\Delta f$ is the subcarrier spacing of the OFDM tones and $F_e$ is the frequency of the zero-subcarrier, which is equal to the LO frequency error relative to received signal carrier. $V_{dc}$ is the uncorrected DC and is equal to the DC step if GSM Tx starts after the short training sequence of the WLAN Rx packet (the DC estimation and correction is done in the short training sequence).

When $F_e \ll \Delta f$, the FFT leakage to the non-zero subcarriers is very small, and therefore the S/N degradation is minimal. Therefore, one aspect of the present invention is to do coarse frequency correction to within 10 kHz for 802.11a/g based standards, or to a value $\ll \Delta F$, by physically changing the LO frequency of the down converters. This is done by programming the fractional-N synthesizer in the PLL or by other means (e.g., using a frequency-offset mixer in the RF or LO paths), with or without actually changing the Reference Clock frequency of the PLL. The Reference clock frequency adjustment is usually much coarser than the fractional-N Synthesizer based correction. The 10 kHz represents 3% of the subcarrier spacing of 312.5 kHz. While 3% or less is preferred, other small percentages could be used if desired, provided they alone or with other techniques reduce the FFT leakage to the non-zero subcarriers to a satisfactory level. The Receiver Symbol Clock frequency error is digitally corrected by the same fractional amount as the fractional correction by the synthesizer. This is required for proper demodulation of the signal. It can be achieved by time domain interpolation of the received I and Q samples. The same concept is described later in more detail, but for the case of the transmitter.

Once the RF frequency of the WLAN receiver LO is corrected for the receive mode, it cannot be quickly uncorrected for the transmit mode e.g. by reprogramming the fractional-N synthesizer, due to the short Rx to Tx transition time and the comparatively long PLL settling time to a desired 1 kHz final frequency error (i.e. to within +−0.50 of Δf). Note that both the transmitter and receiver LO frequencies are generated from the same PLL and synthesizer in a TDD system. It is important to maintain the LO frequency fractional error during the transmit mode identical to the fractional frequency error of the Symbol Clock (which is derived from the Reference Clock usually as a simple binary integer multiple or submultiple), since otherwise the intended receiver may not be aware that the received carrier frequency error in PPM is not the same as the Symbol clock frequency error in PPM. This will impair the symbol timing and clock phase tracking in the intended receiver since the estimated PPM error of the received carrier frequency would be used directly to correct for the symbol timing clock frequency error that actually would have a different PPM value. It is for this reason that the 802.11a/g and 802.16e standards require that the Carrier frequency and symbol clock frequency be locked and derived from the same reference clock. Incorrect Symbol Clock frequency (which is directly related to I and Q ADC sampling clock frequency) can also create unwanted artifacts like derotation of the original I(t) and Q(t) samples that should have been used for the generation of the I and Q baseband samples of the transmitted OFDM symbols, since the time "t" is now replaced by "α*t" where "α" takes into effect the PPM error of the Symbol Clock frequency. The transmitted and received samples would now be I(α*t) and Q(α*t) instead of I(t) and Q(t). One way to circumvent this problem is to interpolate the I and Q samples at the transmitter in the time domain so that the correct I(t) and Q(t) is transmitted instead of I(α*t) and Q(α*t).

Alternately, the RF LO frequency in the Tx mode can be corrected using a frequency-offset mixer in the LO path. To shift the LO by an amount $F_e$, the original complex LO signal Cos(2πF$_c$t)−j*Sin(2πF$_c$t) has to be multiplied by Cos(2πF$_e$t)−j*Sin(2πF$_e$t) using a complex multiplier (e.g. using an image reject mixer). The offset frequency input signals Cos(2πF$_e$t) and Sin(2πF$_e$t) to the mixer can come from the baseband ASIC via additional two D/A's.

To further mitigate the IP2 effects on PER (packet error rate), continuous DC correction can be implemented in the receiver I,Q signal paths. Once the signal is acquired (gain control and symbol timing completed), the DC levels of I(n) and Q(n) are computed every symbol, e.g., over a period of the FFT time window or $T_{FFT}$ (which is less than the symbol time by the amount of the guard interval or cyclic prefix duration). These DC levels are then subtracted from the corresponding I(n) and Q(n) samples for that particular symbol prior to demodulation, i.e., prior to taking the FFT. By doing this, the error vector magnitude (EVM) of the demodulated signal can be considerably reduced as shown in the following simulation results. However, this DC cancellation must be done along with the receiver RF frequency correction, or otherwise the receiver EVM becomes very large.

Figure 6:
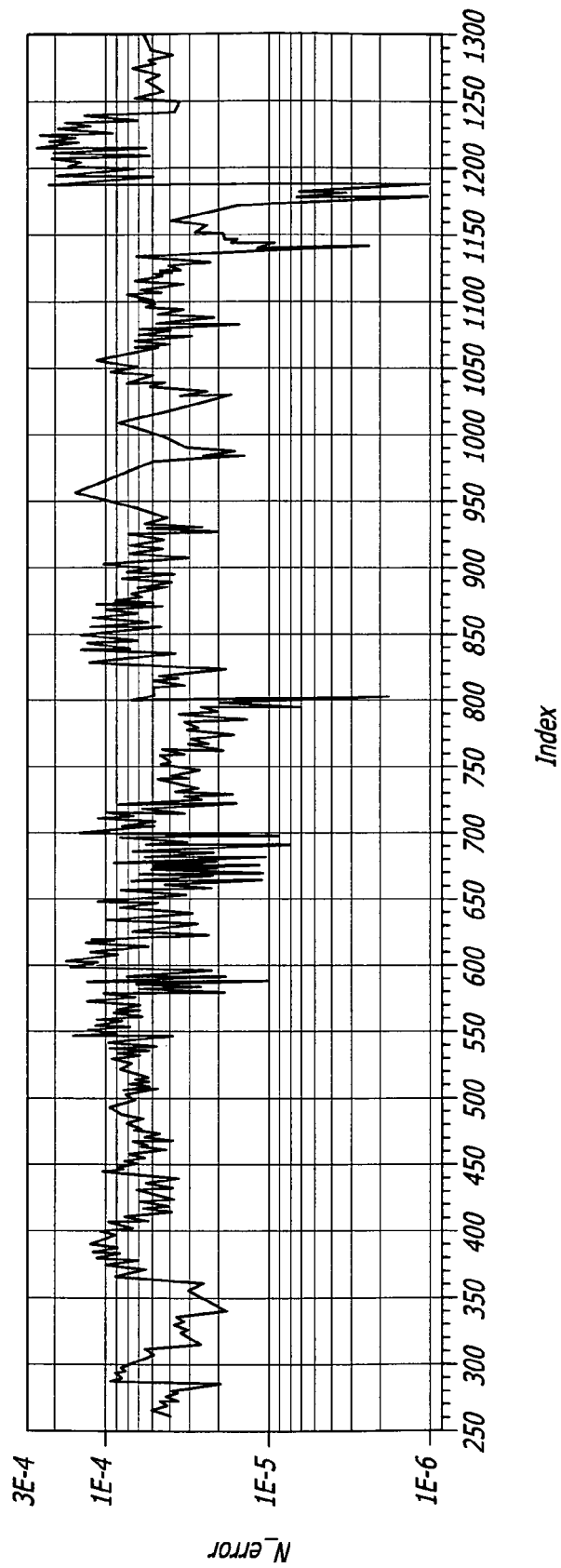
FIG. 6 illustrates that with IP2 effects, rise time of GSM is not critical, and that a 10 usec rise time had no impact on EVM.
Figure 7:
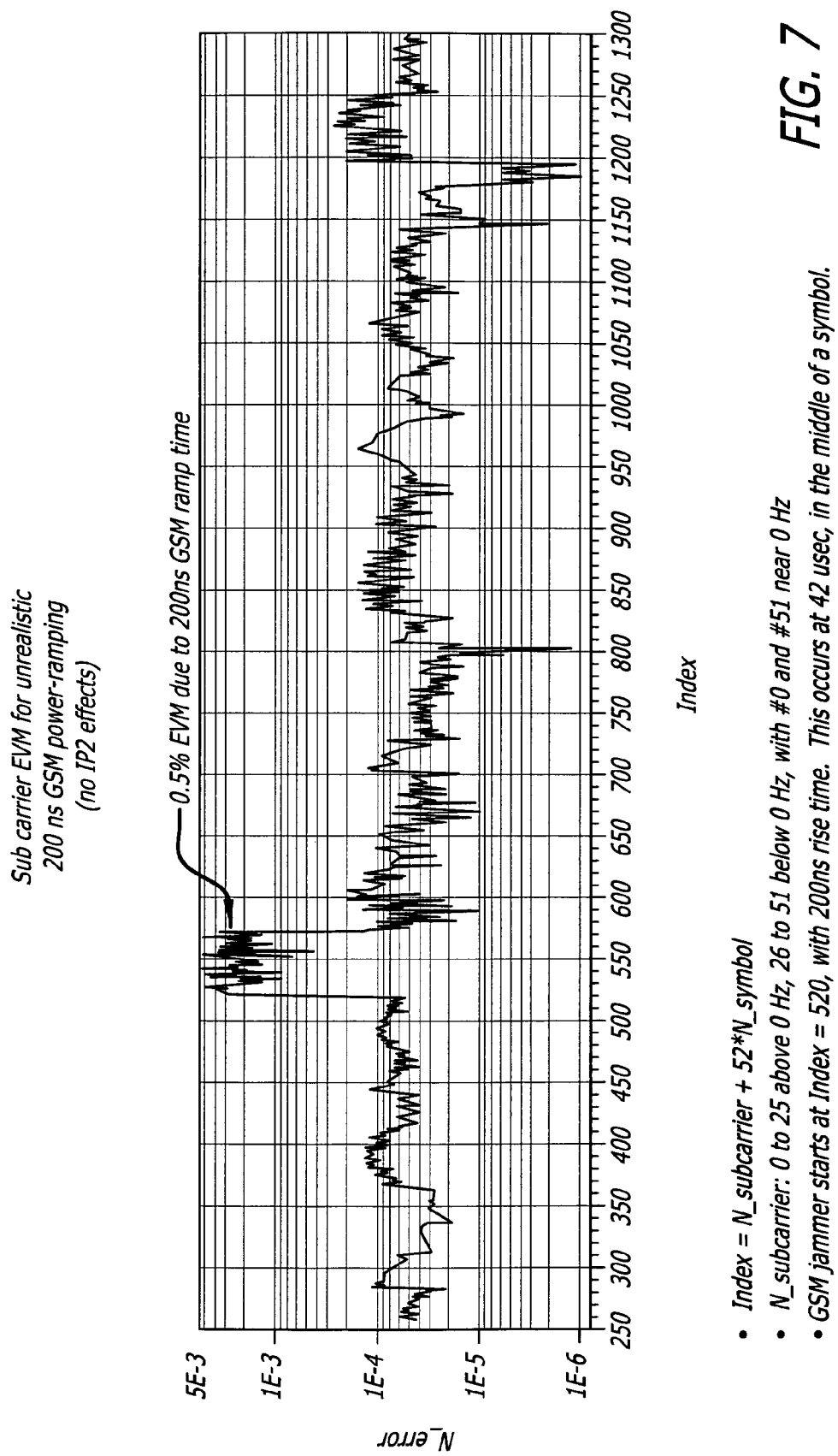
FIG. 7 illustrates the effect of a 200 ns rise time on the peak EVM for an affected symbol.

The simulation results may be summarized as follows:

Without IP2 effects, rise time of GSM is not critical. 10 usec rise time had no impact on EVM (FIG. 6). 200 ns rise time resulted in 0.5% peak EVM for the affected symbol (FIG. 7). With actual 500 MHz separation for DCS 1900, the peak EVM will be even less.

Figure 8:
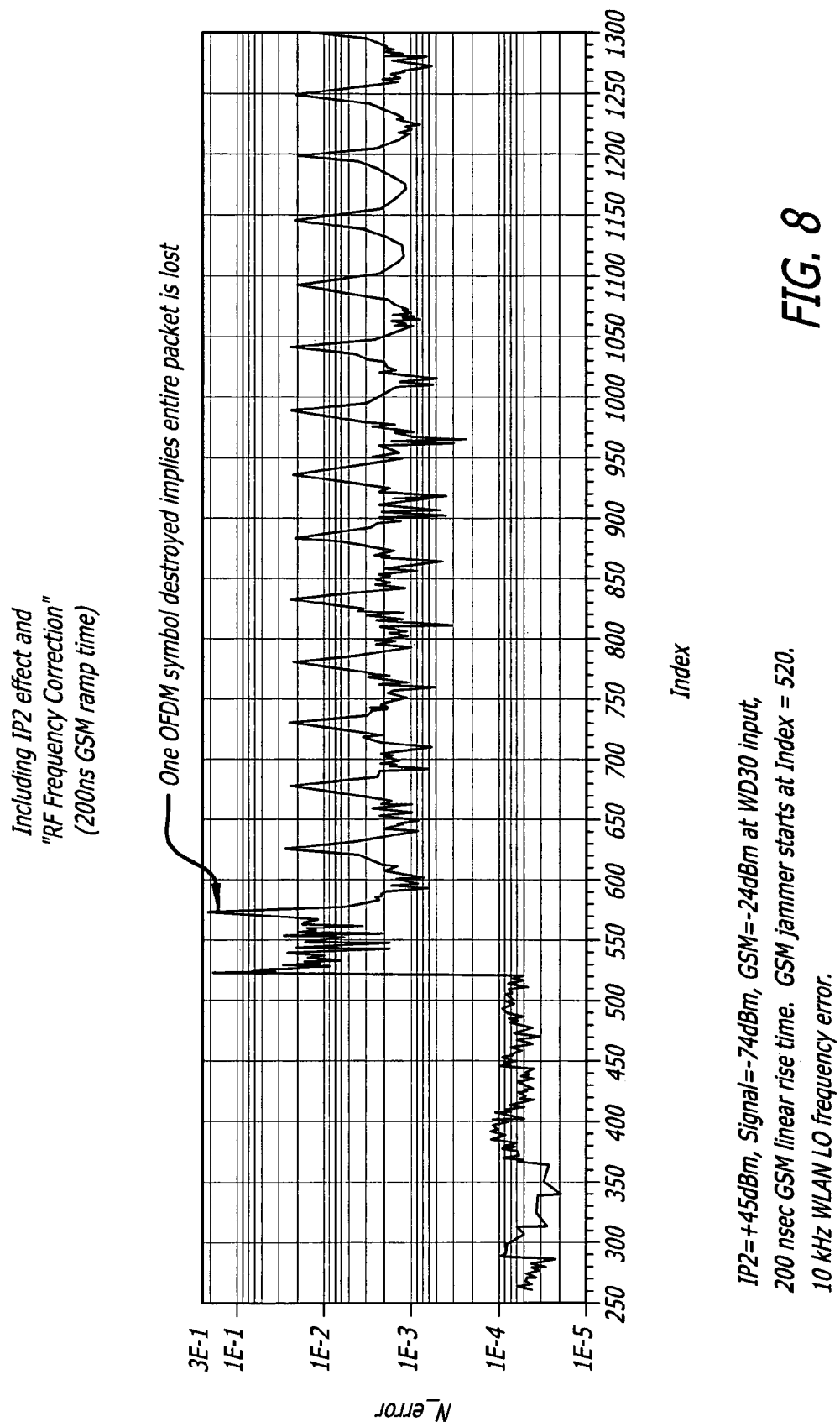
FIG. 8 illustrates that with IP2 effects on GSM jammer, there is a step in I,Q DC levels of the WLAN ZIF receiver, that results in unacceptably high EVM if the jammer rise time is small.
Figure 9:
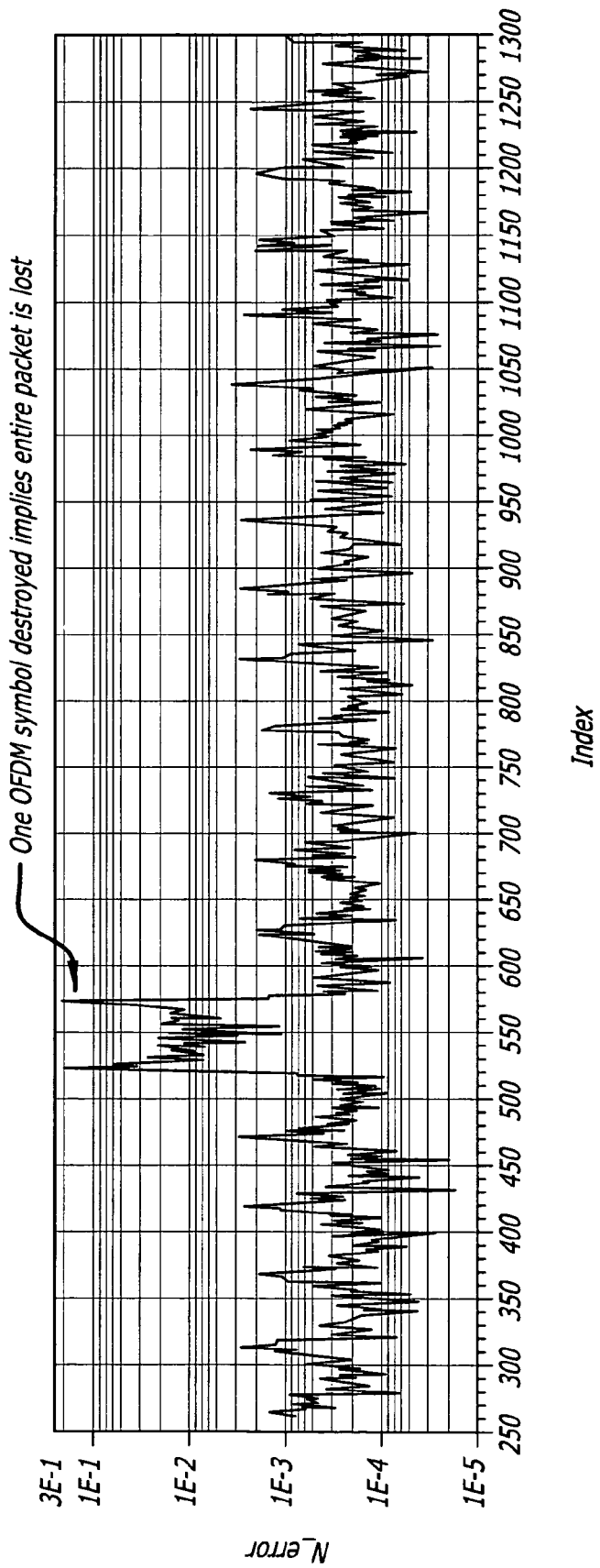
FIG. 9 illustrates that the 1st affected OFDM symbol EVM is higher since the DC step occurred in the middle of that symbol.

With IP2 effects on GSM jammer, there is a step in I,Q DC levels of the WLAN ZIF receiver, and it results in unacceptably high EVM (FIG. 8) if the jammer rise time is small. The 1st affected OFDM symbol EVM is higher since the DC step occurred in the middle of that symbol. For the following symbols, the EVM is smaller since the DC level is constant. However, the EVM is still unacceptably large. Even with "DC Cancellation," the 1st affected OFDM symbol is lost (FIG. 9).

Figure 10:
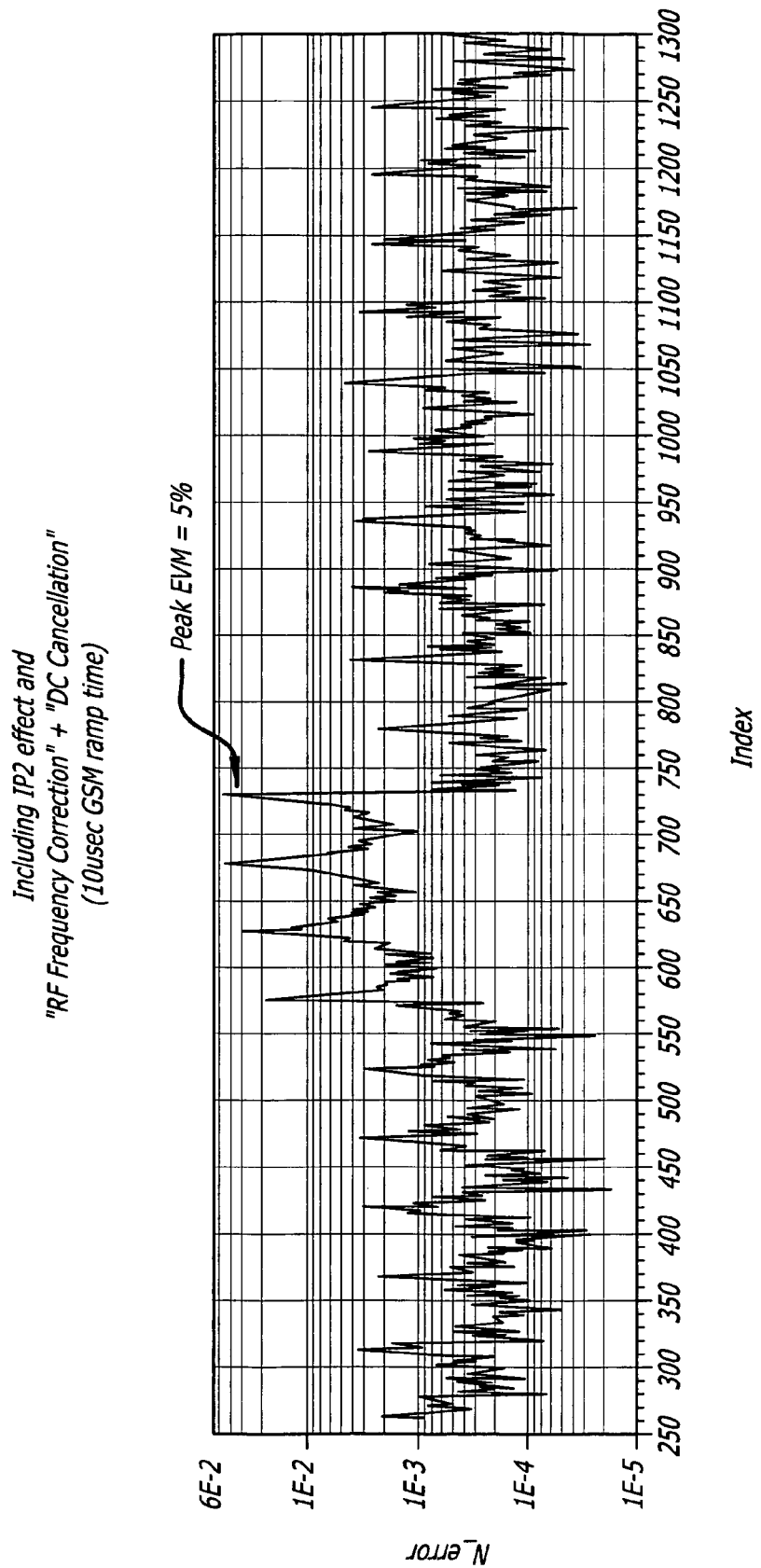
FIG. 10 illustrates that with 10 usec GSM jammer rise time, the EVM can be significantly improved by using a combination of "DC Cancellation" and "RF Frequency Correction."

With 10 usec GSM jammer rise time, the EVM can be significantly improved by using a combination of "DC Cancellation" and "RF Frequency Correction," as shown on FIG. 10 where the highest EVM is only 5%, and occurs at the end of the GSM power ramping. Since de-interleaving and Convolutional coding error correction and can allow up to 10 subcarriers to be lost per symbol, the 26 dBc additional DC interference (corresponding to 5% EVM) will not result in significant PER degradation.

Figure 11:
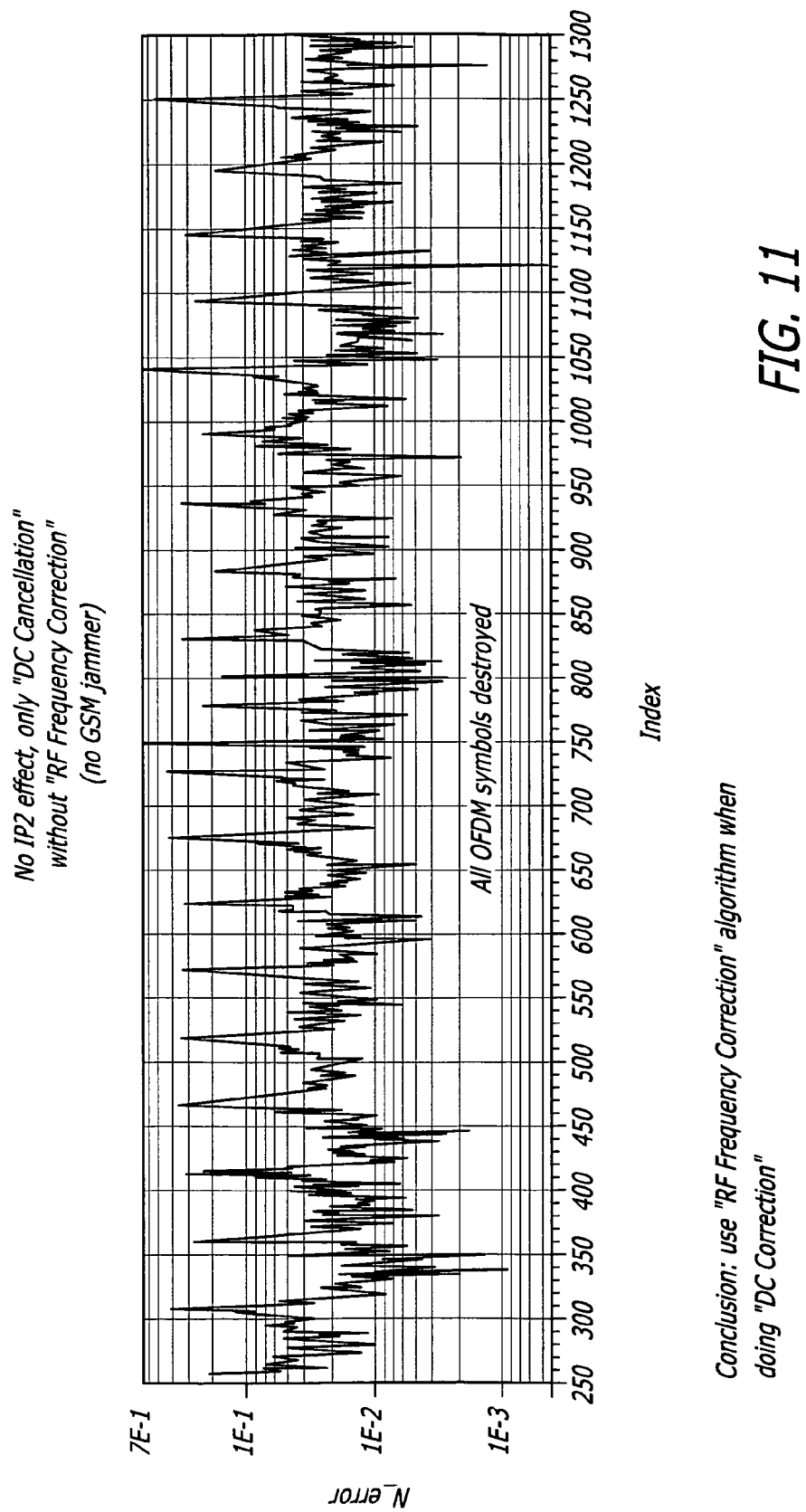
FIG. 11 shows that the peak EVM is in the 30-70% range with "DC Correction" when the "RF Frequency Correction" is switched off, even when there is no GSM jammer.

The "DC Cancellation" works best with the "RF Frequency Correction". FIG. 11 shows that the peak EVM is in the 30-70% range with "DC Correction" when the "RF Frequency Correction" is switched off, even when there is no GSM jammer.

The RF fractional-N synthesizer has a finite frequency step size of Fs and this limits the accuracy of the frequency correction to within +−$F_s$/2. While transmitting, it is important to limit the frequency error $F_e$ to within about +−50 Hz as required by the system for WiMAX, for a 10 kHz ΔF subcarrier spacing. This residual frequency error (e.g. +−25 Hz for some WiMAX transceivers from MAXIM Integrated Products) can be corrected by de-rotating the transmitter I,Q samples.

To correct the transmitted signal by the amount $F_s$/2, the baseband I,Q signals are modified. Let the original Tx signal be:

$$\text{Real}[\{I(t)+jQ(t)\}e^{j2\pi f'_c t}],$$

where $f'_c$ is the corrected carrier frequency, then the uncorrected signal is:

$$\text{Real}\left[\{I(t)+jQ(t)\}e^{j2\pi\left(f'_c - \frac{F_s}{2}\right)t}\right] = \text{Real}\left[\{[I(t)+jQ(t)]e^{-j\pi F_s t}\}e^{j2\pi f'_c t}\right] =$$
$$\text{Real}[\{[I(t)\text{Cos}(\pi F_s t)+Q(t)\text{Sin}(\pi F_s t)] +$$
$$j[Q(t)\text{Cos}(\pi F_s t)-I(t)\text{Sin}(\pi F_s t)]\}e^{j2\pi f'_c t}]$$

Therefore I(t) is replaced with:

I(t)Cos(πF$_s$t)+Q(t)Sin(πF$_s$t), and Q(t) is replaced with:

Q(t)Cos(πF$_s$t)−I(t)Sin(2πF$_s$t)t

This can be done digitally prior to the I,Q D/A.

Also whenever the transmitter I,Q signals are being digitally derotated to remove errors up to +−Fs/2, the DC error in the I,Q analog signal paths and the LO leakage should be calibrated out to minimize the impairment to the EVM. This is because the DC error and LO leakage is equivalent to energy at up to +−Fs/2 Hz due to derotation, and this leads to FFT leakage during demodulation.

In the foregoing description, either the local oscillator frequency may be corrected, and the transmit signal shifted back, or the local oscillator frequency not shifted, but the received signal effectively demodulated using a corrected carrier, either in the analog or the digital domain. As a further alternative, once the frequency error $F_e$ has been corrected on receiving a signal as described above, the corrected frequency may be used for transmit also. In doing so, however, the symbol clock frequency must be locked to the corrected carrier frequency for the reasons hereinbefore set forth. Also of course, while the corrected carrier frequency may used for one reception, a permanent correction is not meaningful, as a received signal transmitted by another transmitter will normally have an excessive relative frequency error $F_e$, thereby requiring correction of the frequency error, whether starting from the "uncorrected" carrier frequency or from the carrier frequency "corrected" during the prior reception. Accordingly, a carrier frequency corrected while receiving a transmission from one transmitter will be an uncorrected carrier while receiving a transmission from another transmitter.

For transceivers such as WiMAX transceivers where greater accuracy in transmission frequency is required, the transmitter I,Q samples may be derotated for correcting residual frequency error arising from the finite step size of the local oscillator fractional-N synthesizer.

Without the present invention, a receiver would have to be designed to meet an IIP2 (input intercept point, 2nd order) of +56 dBm, which is extremely difficult. By using the present invention, the receiver only requires an IIP2 of +36 dBm, which is easily achievable.

Figure 12:
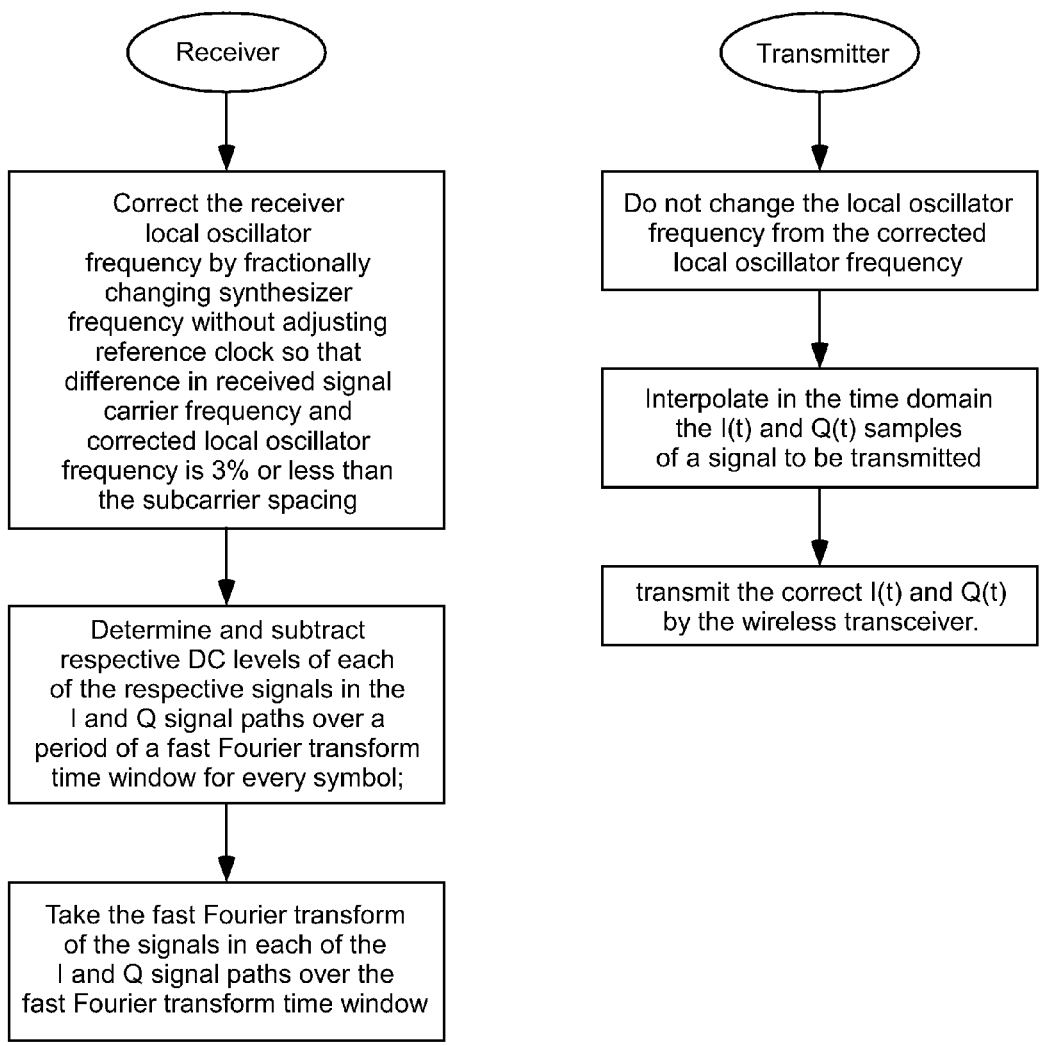
FIG. 12 presents an exemplary flow chart illustrating one embodiment of the present invention.

FIG. 12 presents an exemplary flow chart illustrating one embodiment of the present invention. As shown therein, for the receiver, first correct the receiver local oscillator frequency by fractionally changing synthesizer frequency without adjusting reference clock so that difference in received signal carrier frequency and corrected local oscillator frequency is 3% or less than the subcarrier spacing. Then determine and subtract respective DC levels of each of the respective signals in the I and Q signal paths over a period of a fast Fourier transform time window for every symbol. Then take the fast Fourier transform of the signals in each of the I and Q signal paths over the fast Fourier transform time window.

For the receiver, do not change the local oscillator frequency from the corrected local oscillator frequency, but interpolate in the time domain the I(t) and Q(t) samples of a signal to be transmitted, and then transmit the correct I(t) and Q(t) by the wireless transceiver.

While certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of relaxing the IP2 (2nd order intercept point) requirements for an 802.11a/g or a WiMAX wireless receiver of a transceiver having RF I and Q signal paths that need to work in an environment with strong jamming signals, the wireless receiver having a local oscillator having an uncorrected local oscillator frequency that differs from the carrier frequency of a received signal by a percentage of a subcarrier frequency spacing, comprising:
   correcting the uncorrected local oscillator frequency of the wireless receiver by fractionally changing a synthesizer frequency and not adjusting a reference clock frequency so that the difference in the frequency of the carrier frequency of a received RF signal and the corrected local oscillator frequency of the wireless receiver to a down shifting mixer is at a difference frequency that is 3% or less than the subcarrier spacing;
   determining and subtracting respective DC levels of each of the respective signals in the I and Q signal paths over a period of a fast Fourier transform time window for every symbol;
   taking a fast Fourier transform of the signals in each of the I and Q signal paths over the fast Fourier transform time window after the respective DC level has been subtracted;
   transmitting signals from the I and Q signal paths of the transceiver without changing the local oscillator frequency from the corrected local oscillator frequency, interpolating in the time domain the I(t) and Q(t) samples of the signals to be transmitted so that the correct I(t) and Q(t) are transmitted by the wireless transceiver.

2. The transceiver of claim 1, wherein a relative fractional frequency error between the receiver corrected local oscillator frequency and the reference clock frequency that is derived from a crystal oscillator that drives a sampling clock of analog to digital converter samplers of the I and Q signals, is compensated by interpolating the receiver I and Q sampled signals in the time domain in order to obtain the correct sampling values of the I and Q received signals.

3. The transceiver of claim 1, wherein a transmitter local oscillator frequency is the same as the receiver corrected local oscillator frequency in a time division duplexing system or at a fixed offset in a frequency division duplexing system, and a relative fractional frequency error between the transmitter local oscillator and the reference clock frequency that drives a clock of digital to analog converters of the transmit I and Q signals and is derived from a crystal oscillator, is compensated by interpolating the transmitted I and Q sampled signals in the digital domain prior to conversion to the analog domain.

* * * * *